(12) United States Patent
Suzuki et al.

(10) Patent No.: US 10,489,926 B2
(45) Date of Patent: Nov. 26, 2019

(54) IMAGE PROCESSING DEVICE, IMAGE PROCESSING METHOD, AND PROGRAM

(71) Applicant: Mitsubishi Electric Corporation, Tokyo (JP)

(72) Inventors: Daisuke Suzuki, Tokyo (JP); Takeo Fujita, Tokyo (JP); Toru Aoki, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 10 days.

(21) Appl. No.: 15/754,162

(22) PCT Filed: Aug. 8, 2016

(86) PCT No.: PCT/JP2016/073287
§ 371 (c)(1),
(2) Date: Feb. 21, 2018

(87) PCT Pub. No.: WO2017/038395
PCT Pub. Date: Mar. 9, 2017

(65) Prior Publication Data
US 2018/0247423 A1    Aug. 30, 2018

(30) Foreign Application Priority Data

Aug. 31, 2015  (JP) ................................ 2015-170358

(51) Int. Cl.
*G06K 9/00*        (2006.01)
*G06T 7/536*       (2017.01)
(Continued)

(52) U.S. Cl.
CPC .............. *G06T 7/536* (2017.01); *G06T 5/003* (2013.01); *G06T 5/50* (2013.01); *G06T 7/579* (2017.01);
(Continued)

(58) Field of Classification Search
CPC ......... G06T 7/536; G06T 7/579; G06T 5/003; G06T 5/50; G06T 2207/20201; G06T 2207/30252; G06T 2207/10016
(Continued)

(56) References Cited

U.S. PATENT DOCUMENTS 6,531,959 B1    3/2003  Nagaoka et al.
7,339,612 B1 *  3/2008  Yajima ................. G02B 27/646
                                              348/208.2
(Continued)

FOREIGN PATENT DOCUMENTS

JP    2001-84497 A    3/2001
JP    2002-112252 A   4/2002
(Continued)

*Primary Examiner* — Van D Huynh
(74) *Attorney, Agent, or Firm* — Birch, Stewart, Kolasch & Birch, LLP (57) ABSTRACT

An image processing device is provided with an optical flow calculation circuit (101) for calculating a plurality of optical flows between a first image and a second image captured before the first image, a vector decomposition circuit (102) for decomposing each of the optical flows into a vanishing point direction vector and an orthogonal vector, a vibration blur amount calculation circuit (103) for calculating the aggregate values of horizontal and vertical components of the orthogonal vector and calculating the amount of vibration blur of the first image based on the aggregate values, an optical flow starting point correction circuit (104) for correcting the calculated optical flows by the amount of vibration blur, and a vanishing point calculation circuit (105) for calculating a vanishing point of the first image based on the corrected optical flows.

9 Claims, 6 Drawing Sheets

(51) Int. Cl.
   *G06T 7/579*   (2017.01)
   *G06T 5/00*    (2006.01)
   *G06T 5/50*    (2006.01)

(52) U.S. Cl.
   CPC ............... *G06T 2207/10016* (2013.01); *G06T 2207/20201* (2013.01); *G06T 2207/30252* (2013.01)

(58) Field of Classification Search
   USPC ........................................................ 382/104
   See application file for complete search history.

(56) References Cited

U.S. PATENT DOCUMENTS

| | | | | |
|---|---|---|---|---|
| 2002/0036692 A1* | 3/2002 | Okada | ................ | H04N 5/23248 |
| | | | | 348/208.99 |
| 2005/0225645 A1* | 10/2005 | Kaku | ........................ | G06T 7/20 |
| | | | | 348/208.99 |
| 2006/0008120 A1* | 1/2006 | Ohkubo | ............. | B60R 21/0134 |
| | | | | 382/103 |
| 2014/0037138 A1* | 2/2014 | Sato | ........................ | G08G 1/166 |
| | | | | 382/103 |
| 2016/0196654 A1* | 7/2016 | Aoki | ......................... | G06T 7/73 |
| | | | | 382/103 |
| 2018/0060679 A1* | 3/2018 | Park, II | ............. | G06K 9/00798 |

FOREIGN PATENT DOCUMENTS

| | | |
|---|---|---|
| JP | 2006-170961 A | 6/2006 |
| JP | 5321540 B2 | 10/2013 |

* cited by examiner

IMAGE PROCESSING DEVICE, IMAGE PROCESSING METHOD, AND PROGRAM

TECHNICAL FIELD

The present invention relates to an image processing device, an image processing method, and a program, and in particular to an image processing device, an image processing method, and a program for calculating optical flows from images captured successively.

BACKGROUND ART

As a conventional image processing device, there is known one that, in a captured image which has radial optical flows centered at a point in the image, calculates the point as a vanishing point and corrects the image so that the calculated position of the vanishing point becomes the center of the image (See Patent Reference 1, for example).

PRIOR ART REFERENCE

Patent Reference

Patent Reference 1: Japanese Patent No. 5321540 Publication (Paragraphs 0009-0010, 0044-0047)

SUMMARY OF THE INVENTION

Problem to be Solved by the Invention

The conventional image processing device assumes that optical flows obtained from captured images spread radially from a vanishing point as a center in the captured images. Accordingly, the conventional image processing device can correct images with respect to vehicle's slow bounding along a road surface, which does not undermine the assumption that optical flows spread radially from a vanishing point.

However, as for vehicle's vibration caused by a bump or the like of a road surface, for which optical flows do not spread radially from a vanishing point, the conventional image processing device cannot calculate the position of the vanishing point and cannot correct the vibration blur generated in the images.

Thus, an object of the present invention is to make it possible to calculate a position of a vanishing point of an image even if vibration occurs resulting in optical flows that do not spread radially from the vanishing point of the image.

Means of Solving the Problem

An image processing device according to one mode of the present invention has: an optical flow calculation part to calculate a plurality of optical flows between a first image and a second image captured before the first image; a vector decomposition part to decompose each of the plurality of optical flows into a vanishing point direction vector in a parallel direction parallel to a line segment connecting a starting point of each of the plurality of optical flows with a vanishing point of the second image, and an orthogonal vector in a direction perpendicular to the parallel direction, the vanishing point of the second image being calculated based on a plurality of optical flows calculated between the second image and a third image captured before the second image; a vibration blur amount calculation part to calculate aggregate values of horizontal components and vertical components of the orthogonal vectors, and to calculate a vibration blur amount of the first image based on the aggregate values; an optical flow correction part to correct the plurality of optical flows calculated between the first image and the second image, depending on the vibration blur amount; and a vanishing point calculation part to calculate a vanishing point of the first image, based on the plurality of optical flows corrected by the optical flow correction part.

An image processing method according to one mode of the present invention has: calculating a plurality of optical flows between a first image and a second image captured before the first image; decomposing each of the plurality of optical flows into a vanishing point direction vector in a parallel direction parallel to a line segment connecting a starting point of each of the plurality of optical flows with a vanishing point of the second image, and an orthogonal vector in a direction perpendicular to the parallel direction, the vanishing point of the second image being calculated based on a plurality of optical flows calculated between the second image and a third image captured before the second image; calculating aggregate values of horizontal components and vertical components of the orthogonal vectors, and calculating a vibration blur amount of the first image based on the aggregate values; correcting the plurality of optical flows calculated between the first image and the second image, depending on the vibration blur amount; and calculating a vanishing point of the first image, based on the plurality of corrected optical flows.

A program according to one mode of the present invention makes the computer function as: an optical flow calculation part to calculate a plurality of optical flows between a first image and a second image captured before the first image; a vector decomposition part to decompose each of the plurality of optical flows into a vanishing point direction vector in a parallel direction parallel to a line segment connecting a starting point of each of the plurality of optical flows with a vanishing point of the second image, and an orthogonal vector in a direction perpendicular to the parallel direction, the vanishing point of the second image being calculated based on a plurality of optical flows calculated between the second image and a third image captured before the second image; a vibration blur amount calculation part to calculate aggregate values of horizontal components and vertical components of the orthogonal vectors, and to calculate a vibration blur amount of the first image based on the aggregate values; an optical flow correction part to correct the plurality of optical flows calculated between the first image and the second image, depending on the vibration blur amount; and a vanishing point calculation part to calculate a vanishing point of the first image, based on the plurality of optical flows corrected by the optical flow correction part.

EFFECTS OF THE INVENTION

According to one mode of the present invention, a position of a vanishing point of an image can be calculated by correcting optical flows depending on vibration blur of the image.

MODE FOR CARRYING OUT THE INVENTION

Embodiment 1

Figure 1:
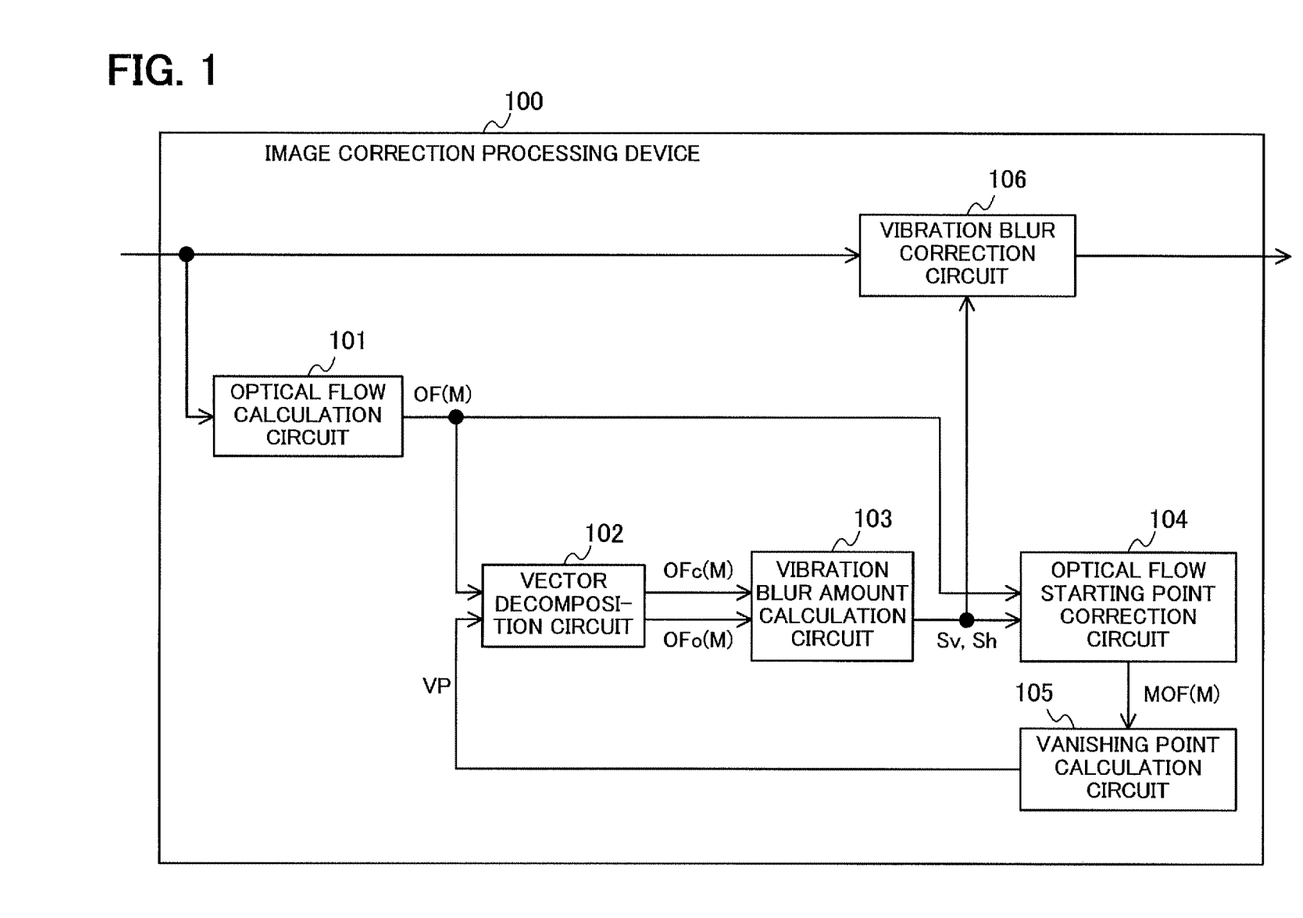
FIG. 1 is a block diagram illustrating schematically a configuration of an image correction processing device according to an embodiment 1.

FIG. 1 is a block diagram illustrating schematically a configuration of an image correction processing device 100 as an image processing device according to the embodiment 1.

The image correction processing device 100 is mounted on a vehicle and receives input of captured images from a not shown image capturing device. The image correction processing device 100 has an optical flow calculation circuit 101 as an optical flow calculation part; a vector decomposition circuit 102 as a vector decomposition part; a vibration blur amount calculation circuit 103 as a vibration blur amount calculation part; an optical flow starting point correction circuit 104 as an optical flow correction part; a vanishing point calculation circuit 105 as a vanishing point calculation part; and a vibration blur correction circuit 106 as a vibration blur correction part.

An image processing method according to the embodiment 1 is a method executed by the image correction processing device 100.

The optical flow calculation circuit 101 calculates a plurality of optical flows between an inputted captured image (a first image or a second image) and a captured image (a second image or a third image) that has been captured before that captured image. For example, the optical flow calculation circuit 101 calculates optical flows OF (M) based on temporal changes of positions of N objects (N is an integer larger than or equal to 2) in the inputted captured images. Here, M is an integer larger than or equal to 2.

As for a method of calculating the optical flows OF (M), a publicly-known method can be employed. For example, the optical flow calculation circuit 101 calculates M characteristic points by a block matching method and calculates the optical flows OF (M) based on motion vectors of the characteristic points.

Figure 2:
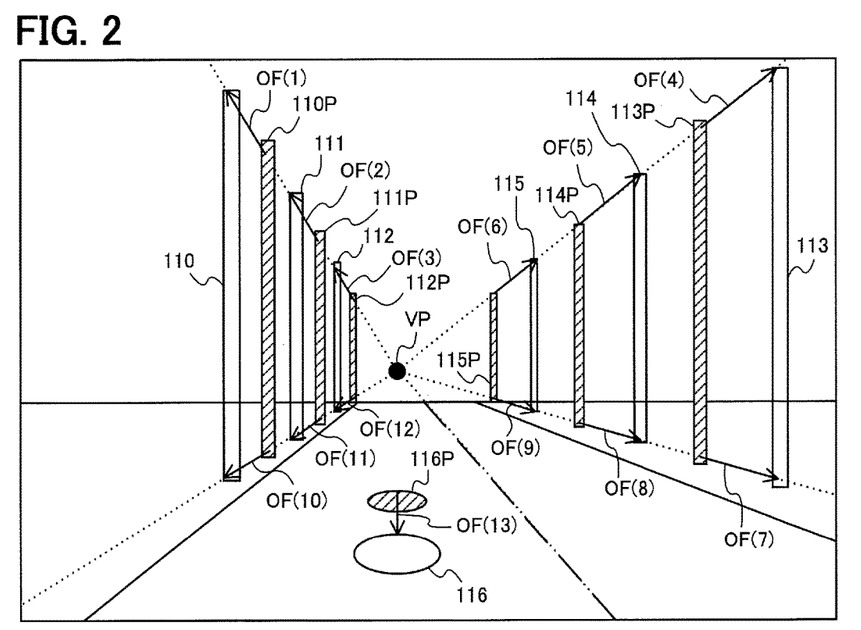
FIG. 2 illustrates a first example of a captured image in the embodiment 1.

FIG. 2 illustrates an example of a captured image that is captured by an in-vehicle camera mounted on a vehicle, when the vehicle is travelling on a flat left-hand traffic road having one lane on each side.

Utility poles 110-115 are located on both roadsides, and a manhole cover 116 exists in the road ahead of the traveling vehicle.

In FIG. 2, although not shown in the original captured image, the positions of the utility poles 110P-115P in the preceding captured image are shown as hatched vertical bars. In FIG. 2, although not shown in the original captured image, the position of the manhole cover 116P in the preceding captured image is shown as a hatched ellipse.

In FIG. 2, solid arrows represent optical flows OF(1)-OF(13) calculated by the optical flow calculation circuit 101 for the utility poles 110-115 and the manhole cover 116 as objects in the captured image.

Extended lines of the optical flows OF(1)-OF(13) intersect at one point, and therefore it is possible to derive from the optical flows OF(1)-OF(13) a vanishing point VP, which is the origin of the extended optical flows OF(1)-OF(13).

Figure 3:
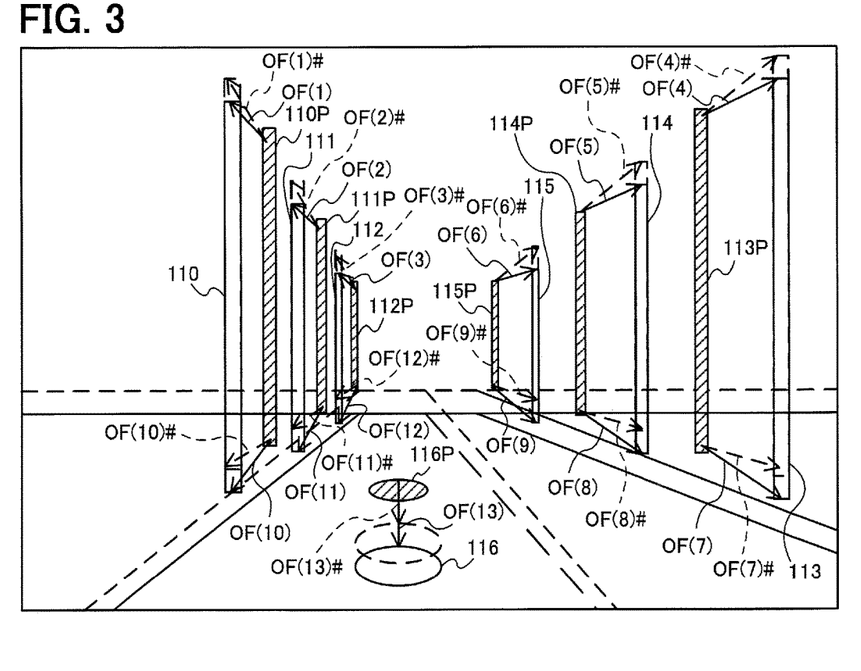
FIG. 3 illustrates a second example of a captured image in the embodiment 1.

FIG. 3 illustrates an example of a captured image in the case where a front tire of the vehicle runs over an object that has fallen on the road and the vehicle happens to vibrate in a vertical direction at the time of capturing the image.

In FIG. 3, the utility poles 110-115 and the manhole cover 116 are also shown.

Further, in FIG. 3, although not shown originally in the captured image, the positions of the utility poles 110P-115P in the captured image obtained just before the front tire of the vehicle runs over the object are shown as hatched vertical bars. Further, in FIG. 3, although not shown in the original captured image, the position of the manhole cover 116P in the captured image obtained just before the front tire of the vehicle runs over the object is shown as a hatched ellipse.

In FIG. 3, dashed arrows represent optical flows OF(1)#-OF(13)# in the captured image at the time when the vehicle's vibration, as described with referring to FIG. 2, did not occur, and solid arrows in the figure represent optical flows OF(1)-OF(13) that are calculated by the optical flow calculation circuit 101 and include the effect of the vehicle's vibration.

Owing to the occurrence of the vertical vibration of the vehicle, extended lines of the optical flows OF(1)-OF(13) in FIG. 3 do not converge on one point, and accordingly a vanishing point cannot be derived from the optical flows OF(1)-OF(13).

TO Return to FIG. 1, the vector decomposition circuit 102 decomposes each of the optical flows OF(M) given from the optical flow calculation circuit 101 into a vector OFc(M) in the direction parallel to a line segment connecting the starting point of each of the optical flows OF(M) with the vanishing point VP in the preceding captured image (second image) and a vector OFo(M) in the direction perpendicular to the vector OFc(M). Hereinafter, the vector OFc(M) is also referred to as the vanishing point direction vector and the vector OFo(M) as the orthogonal vector. The vanishing point VP in the preceding captured image (second image) is calculated based on a plurality of optical flows calculated between the preceding captured image and the captured image (third image) that was captured before the preceding captured image.

Figure 4:
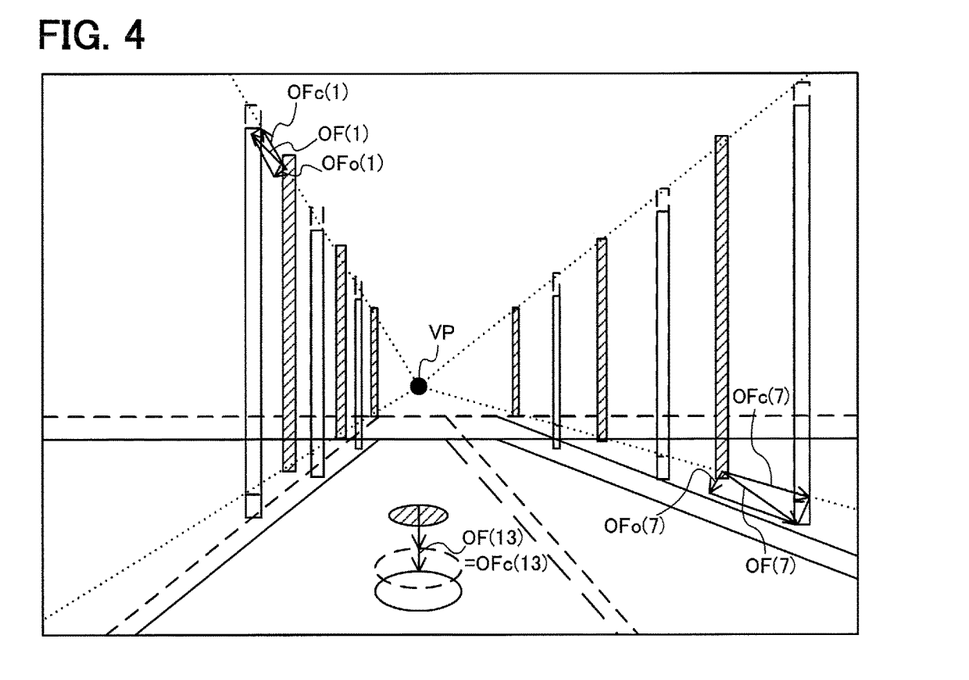
FIG. 4 is a schematic diagram illustrating vectors obtained by decomposing optical flows in the embodiment 1.

FIG. 4 is a schematic diagram illustrating the vectors OFc(i) and the vectors OFo(i) obtained when the vector decomposition circuit 102 decomposes the optical flows OF(i) (i=1, 7, and 13) shown in FIG. 3.

As shown in FIG. 4, since the vanishing point is not found in FIG. 3, the vector decomposition circuit 102 decomposes each optical flow OF(i) into a vector OFc(i) in the direction parallel to a line segment connecting the starting point of each optical flow OF(i) with the vanishing point VP in the preceding captured image and the vector OFo(i) in the direction perpendicular to the vector OFc(i).

As for the optical flow OF(13), the vector OFc(13) does not have a component in the direction perpendicular to the vector OFc(13), and thus the vector OFo(13) becomes a zero vector.

When the vehicle starts to move ahead, the position of the vanishing point VP in the preceding captured image cannot be determined, so that the vector decomposition circuit 102 can start processing assuming that the vanishing point VP is at the center position of the captured image. Alternatively, the vector decomposition circuit 102 may start processing assuming that the vanishing point VP is at a position previously determined from the mounting position and direction of the in-vehicle camera.

The vibration blur amount calculation circuit 103 determines an image horizontal direction component OFoh(M) and an image vertical direction component OFov(M) from a vector OFo(M) given from the vector decomposition circuit 102. Further, the vibration blur amount calculation circuit 103 calculates a vertical vibration blur amount Sv and a horizontal vibration blur amount Sh of the image according to the following equations (1) and (2) from the vectors OFc(M) given from the vector decomposition circuit 102. Here, "horizontal" means the horizontal direction in the captured image (or angle of view) and "vertical" means the vertical direction in the captured image (or angle of view).

$$Sv = \Sigma\{OFov(M)\}/CNTv \quad (1)$$

CNTv=Σ{ABS(cos(angle of OFc(M) from the horizontal direction of the angle of view))}

$$Sh = \Sigma\{OFoh(M)\}/CNTh \quad (2)$$

CNTh=Σ{ABS(sin(angle of OFc(M) from the horizontal direction of the angle of view))}

As shown in the equation (1), the vertical vibration blur amount Sv is calculated by weighting the aggregate value of the vertical components of the vectors OFo(M) with the angles of the vectors OFc(M). Accordingly, the larger the aggregate value of the vertical components of the vectors OFo(M) becomes, the larger the vertical vibration blur amount Sv becomes.

Further, as shown in the equation (2), the horizontal vibration blur amount Sh is calculated by weighting the aggregate value of the horizontal components of the vectors OFo(M) with the angles of the vectors OFc(M). Accordingly, the larger the aggregate value of the horizontal components of the vectors OFo(M) becomes, the larger the horizontal vibration blur amount Sh becomes.

Figure 5:
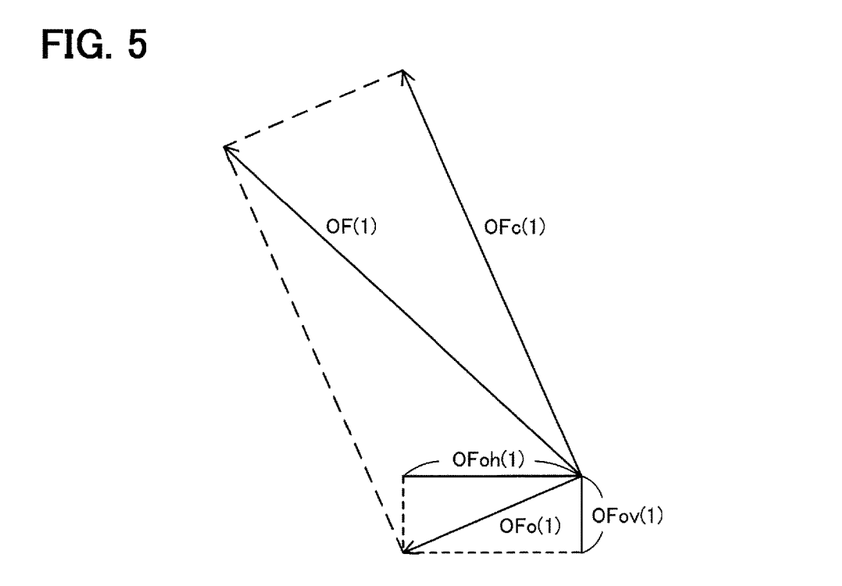
FIG. 5 is a schematic diagram for explaining processing of determining a vertical component and a horizontal component from a vector in the embodiment 1.

FIG. 5 is a schematic diagram for explaining processing of determining the component OFov(1) and the component OFoh(1) from the vector OFo(1) shown in FIG. 4.

The vibration blur amount calculation circuit 103 determines the image vertical direction component OFov(1) and the image horizontal direction component OFoh(1) from the vector OFo(1).

To return to FIG. 1, in the case where the vibration blur amount calculation circuit 103 calculates the vertical vibration blur amount Sv of the image by simple arithmetic averaging of the vertical components OFov(M) of the vectors OFo(M) obtained by decomposition of the M optical flows OF(M), the vibration blur amount in the vertical direction becomes small because the value of a vertical component OFov(M) obtained from an optical flow OF(M) positioned in the vertical direction from the vanishing point is generally small. Accordingly, as shown in the equation (1), the vibration blur amount calculation circuit 103 performs weighting by using a cosine (cos) of an angle from the angle-of-view's horizontal direction of a vector OFc(M) obtained by decomposition of an optical flow OF(M). Thus, the vibration blur amount calculation circuit 103 calculates the vertical vibration blur amount Sv of the image in such a way that the proportion of optical flows OF(M) positioned in the horizontal direction from the vanishing point is larger than the proportion of optical flows OF(M) positioned in the vertical direction from the vanishing point.

Further, in the case where the vibration blur amount calculation circuit 103 calculates the horizontal vibration blur amount Sh of the image by simple arithmetic averaging of the horizontal components OFoh(M) of the vectors OFo(M) obtained by decomposition of the M optical flows OF(M), the vibration blur amount in the horizontal direction becomes small because the value of a horizontal component OFoh(M) of an optical flow OF(M) positioned in the horizontal direction from the vanishing point is generally small. Accordingly, as shown in the equation (2), the vibration blur amount calculation circuit 103 performs weighting by using a sine (sin) of an angle from the angle-of-view's horizontal direction of a vector OFc(M) obtained by decomposition of an optical flow OF(M). Thus, the vibration blur amount calculation circuit 103 calculates the horizontal vibration blur amount Sh of the image in such a way that the proportion of optical flows OF(M) positioned in the vertical direction from the vanishing point is larger than the proportion of optical flows OF(M) positioned in the horizontal direction from the vanishing point.

By performing the above-described weighting depending on the directions of the vectors OFc(M) obtained by decomposition of the optical flows into the respective directions from the vanishing point, the accuracies of calculation of the vibration blur amounts is improved.

The optical flow starting point correction circuit 104 corrects each of optical flows OF(M) given from the optical flow calculation circuit 101 by using the vibration blur amounts given from the vibration blur amount calculation circuit 103. For example, the optical flow starting point correction circuit 104 calculates corrected optical flows MOF(M) by moving a starting point of each of the optical flows OF(M) given from the optical flow calculation circuit 101, by the horizontal vibration blur amount Sh and the vertical vibration blur amount Sv given from the vibration blur amount calculation circuit 103.

Figure 6:
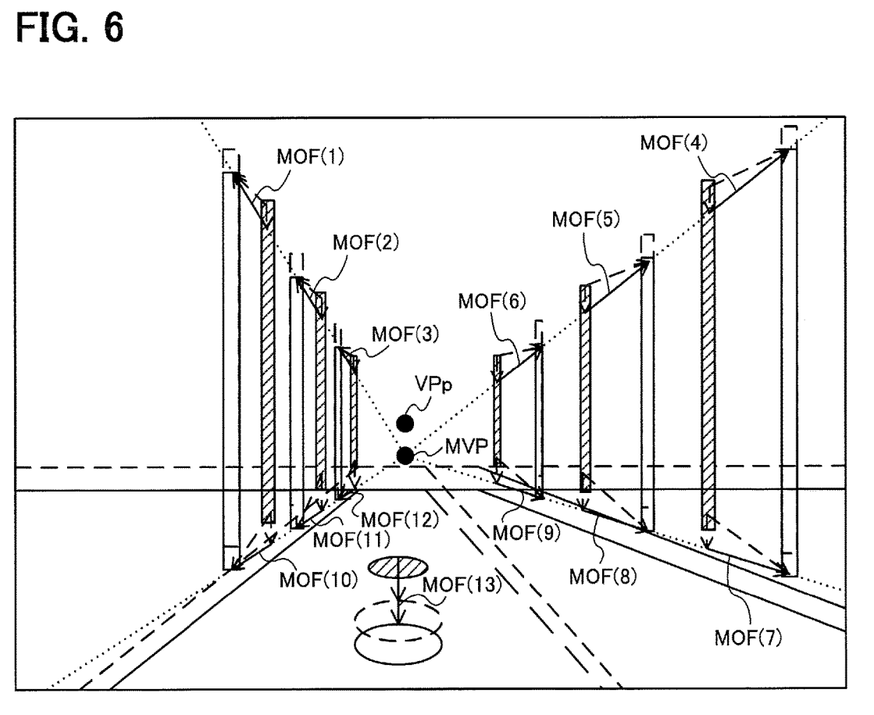
FIG. 6 is a schematic diagram illustrating corrected optical flows in the embodiment 1.

FIG. 6 is a schematic diagram illustrating corrected optical flows MOF(M) that are each obtained by moving the starting point of each of the corresponding optical flows OF(M) by a starting point correction vector=(the horizontal vibration blur amount Sh, the vertical vibration blur amount Sv).

The vanishing point calculation circuit 105 calculates the vanishing point of an inputted captured image based on corrected optical flows MOF(M) given from the optical flow starting point correction circuit 104. For example, as a corrected vanishing point MVP of a captured image, the vanishing point calculation circuit 105 calculates an intersection point at which extended lines of corrected optical flows MOF(M) given from the optical flow starting point correction circuit 104 intersect. In other words, a corrected vanishing point MVP is a point on which extended lines of corrected optical flows MOF(M) converge. When intersection points of extended lines of corrected optical flows MOF(M) concentrate within a predetermined range, it is assumed that the extended lines of the corrected optical flows MOF(M) converge on a point within this range, or in other words, that the extended lines of the corrected flows MOF(M) intersect at a point within this range.

Next, the vanishing point calculation circuit 105 calculates a vanishing point VP by linear interpolation between the vanishing point VPp of the preceding captured image and the corrected vanishing point MVP, according to the following equation (3). Then, the vanishing point calculation circuit 105 updates the vanishing point by replacing the preceding vanishing point VPp with the calculated vanishing point VP. In the equation (3), K means an interpolation coefficient and is previously determined.

$$VP = VPp \times (1-K) + MVP \times K \quad (3)$$

K: a value larger than 0 and less than 1

By applying the linear interpolation processing as shown in the equation (3), which corresponds to time constant processing, it is possible to reduce the effect of the calculation accuracy error produced between the position of the corrected vanishing point MVP and the position of the actual vanishing point.

The vibration blur correction circuit 106 corrects the vibration blur of an inputted captured image using vibration blur amounts given from the vibration blur amount calculation circuit 103.

In detail, the vibration blur correction circuit 106 calculates a vibration blur correction amount Vi, which is a correction value for correcting the vibration blur of the inputted image, from the horizontal vibration blur amount Sh and the vertical vibration blur amount Sv given from the vibration blur amount calculation circuit 103.

For example, in the case where the vibration blur correction amount is defined by a two-dimensional vector Vi=(Vix, Viy), the vibration blur correction circuit 106 can change the trimming starting position of the inputted captured image from (0, 0) to (Vix, Viy).

In the case where the vibration blur correction amount Vi is a two-dimensional vector, the vibration blur correction circuit 106 calculates the vibration blur correction amount Vi, for example according to the following equation (4), by using the horizontal vibration blur amount Sh and the vertical vibration blur amount Sv as outputs of the vibration blur amount calculation circuit 103.

In the equation (4), the characteristics of a correction coefficient G(X) is 0 when X is less than a threshold TH1; increases monotonically from 0 to 1 in the range where X is not less than the threshold TH1 and not more than a threshold TH2; and is 1 when X exceeds the threshold TH2.

$$\begin{aligned} Vi &= (Vix, Viy) \\ &= (Sh \times G(|Sh|), Sv \times G(|Sv|)) \end{aligned} \quad (4)$$

According to the equation (4), the vibration blur of the inputted image is not corrected when the absolute values of the vibration blur amounts are smaller than a predetermined value.

In the case, for example, where the position of the vanishing point moves moderately to a left end of the captured image owing to a curve of a road or the like, the vibration blur correction results in generation of a large deficiency of image on the right side of the captured image if the moderate movement of the position of the vanishing point cannot be removed from the vibration blur correction amount. In the equation (4), however, since the vibration blur correction amount Vi is calculated by multiplying by the correction coefficient G(X), it is possible to remove the moderate movement of the position of the vanishing point from the vibration blur correction amount by adjusting the values of the thresholds TH1 and TH2, so that the effect of causing no large image deficiency is achieved.

The thresholds TH1 and TH2 can be previously determined so that such an effect may be obtained.

The calculation of the vibration blur correction amount Vi by the vibration blur correction circuit 106 is not limited to the method of multiplying by the correction coefficient G(X). For example, it is possible, for each of the horizontal vibration blur amount Sh and the vertical vibration blur amount Sv, to take a difference from a smoothed value that is obtained by using a finite number of values up to the preceding value. In this case also, it is possible to remove a small vibration blur amount caused by moderate transition of the position of the vanishing point, so that a similar effect of causing no large image deficiency may be obtained.

The vehicle vibration blur correction by the vibration blur correction circuit 106 is basically performed by horizontal movement and vertical movement of the inputted image as a whole based on the vibration blur correction amount Vi. However, since vehicle's vibration blur in the horizontal direction does not occur often, the vehicle vibration blur correction by the vibration blur correction circuit 106 can be performed while being limited to vertical movement only of the inputted image as a whole. In that case, the vehicle's vibration blur correction processing can be simplified.

Although the vibration blur amount calculation circuit 103 calculates the horizontal vibration blur amount Sh and the vertical vibration blur amount Sv of the captured image by using the whole image, this example does not impose limitation. For example, the vibration blur amount calculation circuit 103 can also calculate a vibration blur amount in a rotational direction of the captured image by dividing the captured image into cells and calculating a horizontal vibration blur amount and a vertical vibration blur amount of the captured image, from optical flows for each cell. By doing this, it becomes possible for the vibration blur correction circuit 106 to also correct vibration blur in the rotational direction of the captured image.

For example, in the case where only the left tires of the vehicle run over an object, rotation arises with the position of the right tires as the axis of rotation, and the vertical vibration blur amount becomes different between the cells on the left side and the cells on the right side.

In this case, a rotation amount of the captured image can be calculated based on the vertical vibration blur amounts of the cells. Here, description will be given by taking an example where the number of cells in the horizontal direction of the captured image is 10. It is assumed that the vertical vibration blur amount of the left end cell in the lower end of the captured image is 12, the vibration blur amount decreases gradually 1 by 1 toward the right end, and thus the vertical vibration blur amount of the right end cell in the lower end of the captured image is 3. Then, it can be considered that the vertical vibration blur amount is 0 at the third cell (positioned outside the captured image) further rightward from the right end cell in the lower end of the captured image. The vibration blur amount calculation circuit 103 calculates the rotation amount by using this position where the vertical vibration blur amount becomes 0 as the axis of rotation of the captured image.

The vibration blur amount of the captured image in the rotational direction can be corrected (amended) when the vibration blur correction circuit 106 applies counter-rotation processing to the image, based on the calculated rotation amount. Here, the description has been given by taking the example where the axis of rotation and the rotation amount of the captured image are simply calculated from the vertical vibration blur amounts of only the cells in the lower end of the captured image. In practice, however, correction can be performed by obtaining the axis of rotation and the rotation amount from the vertical vibration blur amounts and the horizontal vibration blur amounts of all the cells of the whole captured image and then by performing the counter-rotation processing.

Next will be described an information processing system in which the image correction processing device 100 of the embodiment 1 is connected to a camera as a capturing device that captures images of an object ahead of the vehicle, and a recognition processing device as an information processing device for detecting an object such as a vehicle is connected in the rear stage to the image correction processing device 100.

The image correction processing device 100 is configured to calculate the vibration blur amounts of the captured image from a plurality of optical flows calculated from the current captured image and the vanishing point of the preceding captured image. Accordingly, it is possible to correct the vibration blur of the captured image owing to vehicle vibration even if the optical flows of the current captured image do not radiate from the vanishing point of the captured image.

Since the image correction processing device 100 can correct the vehicle vibration blur which has occurred in the captured image obtained by the in-vehicle camera, the recognition processing device connected in the rear stage to the image correction processing device 100 can improve the accuracies of object detection and object tracking in the image given from the image correction processing device 100.

Since the image correction processing device 100 calculates the vibration blur amount owing to vehicle vibration from optical flows calculated from the captured image and corrects the vibration blur of the captured image, vibration blur correction of the captured image can be performed without an acceleration sensor for detecting vehicle vibration for correcting the vibration blur of the captured image. Accordingly, the image correction processing device 100 can achieve downsizing, power saving, and cost reduction. Further, also in the case where acceleration sensors are mounted for detecting vehicle vibration, the image correction processing device 100 can correct the vibration blur of the captured image owing to vehicle vibration even at the time of breakdown of the acceleration sensors. Accordingly, it is possible to provide a safer image correction processing device 100.

Embodiment 2

Figure 7:
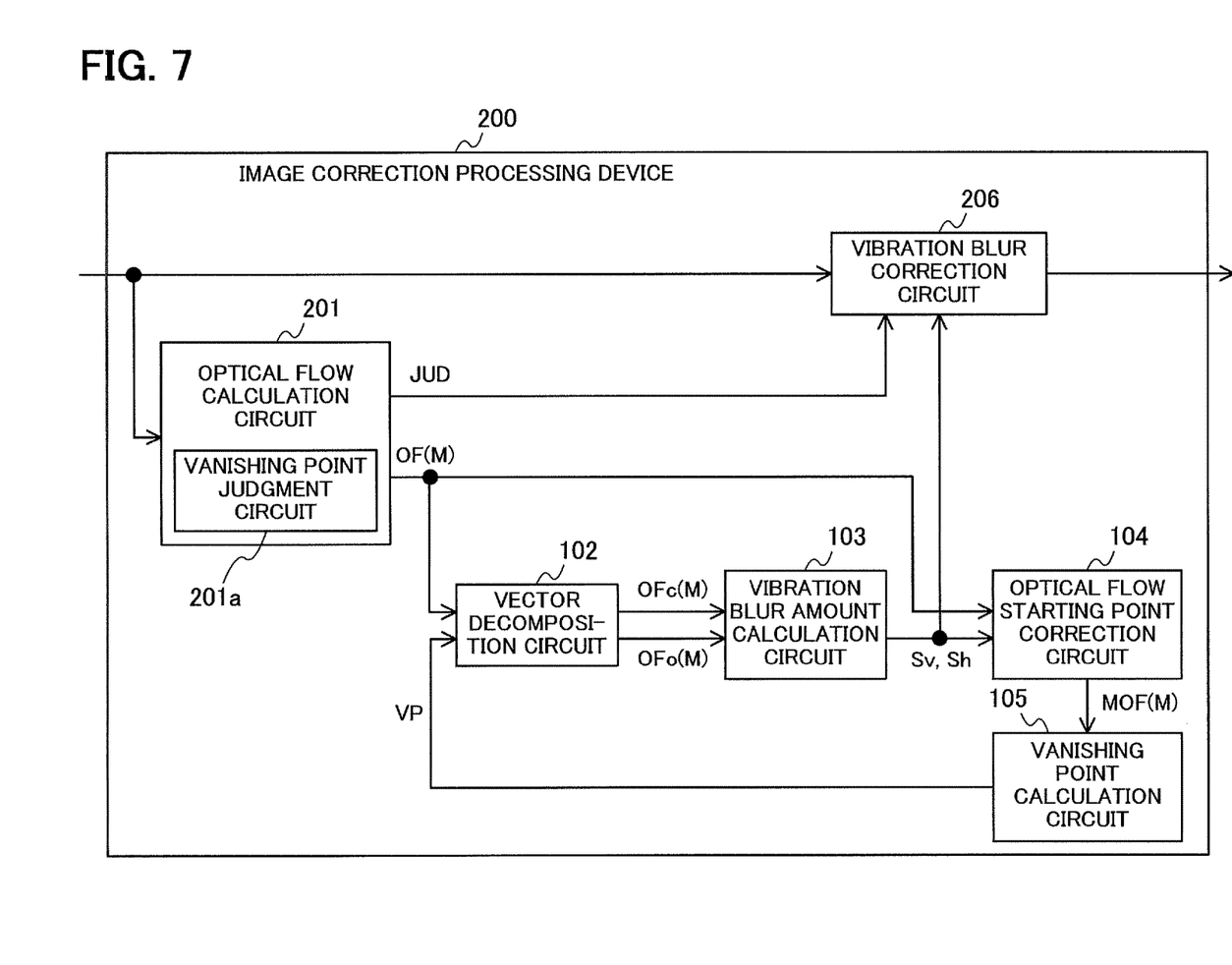
FIG. 7 is a block diagram illustrating schematically a configuration of an image correction processing device according to an embodiment 2.

FIG. 7 is a block diagram illustrating schematically a configuration of an image correction processing device 200 according to the embodiment 2.

The image correction processing device 200 has an optical flow calculation circuit 201; a vector decomposition circuit 102; a vibration blur amount calculation circuit 103; an optical flow starting point correction circuit 104; a vanishing point calculation circuit 105; and a vibration blur correction circuit 206.

The image correction processing device 200 of the embodiment 2 has a similar configuration to the image correction processing device 100 of the embodiment 1 except for the optical flow calculation circuit 201 and the vibration blur correction circuit 206. In the following, the optical flow calculation circuit 201 and the vibration blur correction circuit 206 that are different from those of the embodiment 1 will be described.

An image processing method according to the embodiment 2 is a method performed by the image correction processing device 200.

Similarly to the embodiment 1, the optical flow calculation circuit 201 calculates optical flows OF(M) of N objects (N is an integer larger than or equal to 2) in inputted captured images, based on temporal changes of positions of the objects.

Further, the optical flow calculation circuit 201 has a vanishing point judgment circuit 201a as a vanishing point judgment part.

The vanishing point judgment circuit 201a judges whether there is vibration blur or not, based on the calculated optical flows OF(M). For example, the vanishing point judgment circuit 201a judges whether intersection points of extended lines of the optical flows OF(M) concentrate within an area of a predetermined size in the inputted captured image. In other words, the vanishing point judgment circuit 201a judges whether a vanishing point of the captured image can be calculated based on the calculated optical flows OF(M).

In the case where the intersection points of the extended lines of the optical flows OF(M) concentrate within the area of the predetermined size, the vanishing point judgment circuit 201a judges that one of the calculated intersection points is a vanishing point of the inputted image, and outputs a judgment result JUD=1 to the vibration blur correction circuit 206. The judgment result JUD=1 indicates that a vanishing point has been calculated, or in other words there is no occurrence of vibration blur.

In the case where the intersection points of the extended lines of the optical flows do not concentrate within the area of the predetermined size, the vanishing point judgment circuit 201a outputs a judgment result JUD=0 to the vibration blur correction circuit 206. The judgment result JUD=0 indicates that a vanishing point has not been calculated, or in other words there is occurrence of vibration blur.

In the case where the vanishing point judgment circuit 201a judges that a vanishing point can be calculated, the vibration blur correction circuit 206 does not perform vibration blur correction of the captured image.

For example, in the case where the judgment result JUD outputted from the optical flow calculation circuit 201 is "1", the vibration blur correction circuit 206 performs processing by reading the values of the vibration blur amounts Sh and Sv from the vibration blur amount calculation circuit 103 as "0".

On the other hand, in the case where the judgment result JUD outputted from the optical flow calculation circuit 201 is "0", the vibration blur correction circuit 206 performs similar processing to that of the embodiment 1.

In the case where the vanishing point judgment circuit 201a judges that there is no occurrence of vibration blur, the optical flow calculation circuit 201 may stop calculation in the vector decomposition circuit 102, the vibration blur amount calculation circuit 103, the optical flow starting point correction circuit 104, and the vanishing point calculation circuit 105. In this case, it is possible to obtain the effect of reducing the amount of calculation.

The above-described embodiments 1 and 2 use a vanishing point of optical flows for correcting vibration blur of an image. Embodiments are not limited to such examples. For example, by giving a calculated vanishing point of optical flows to a processing part (not shown) in the rear stage to the image correction processing device 100, 200, the processing part can perform such processing as detection of vehicle speed, detection of distance to an object in the captured image, detection of a three-dimensional position of an object in the captured image, detection of a three-dimensional shape of an object in the captured image, or detection of a position of another vehicle in the captured image, based on the calculated vanishing point of the optical flows.

Each part of the image correction processing devices 100 and 200 according to the embodiments 1 and 2 described hereinabove is made up of circuits such as a single circuit, a composite circuit, a programmed processor, a parallel programmed processor, an Application Specific Integrated Circuit (ASIC), a Field Programmable Gate Array (FPGA), or the like. These examples, however, do not impose limitation.

Figure 8:
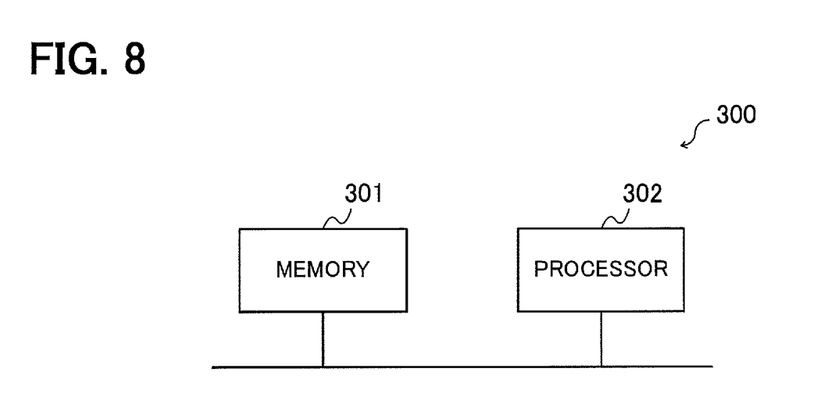
FIG. 8 is a schematic diagram illustrating an example of a hardware configuration of the image correction processing devices according to the embodiments 1 and 2.

For example, as shown in FIG. 8, all or a part of the image correction processing devices 100 and 200 may be implemented by a computer 300 provided with a processor 302 such as a Central Processing Unit (CPU) that executes programs stored in a memory 301. Such programs may be provided through a network, or may be provided by being recorded in a storage medium.

DESCRIPTION OF REFERENCE CHARACTERS

100, 200: image correction processing device; 101, 201: optical flow calculation circuit; 201a: vanishing point judgment circuit; 102: vector decomposition circuit; 103: vibration blur amount calculation circuit; 104: optical flow starting point correction circuit; 105: vanishing point calculation circuit; 106, 206: vibration blur correction circuit; 300: computer; 301: memory; and 302: processor.

What is claimed is:

1. An image processing device, comprising:
   processing circuitry
   to calculate a plurality of optical flows between a first image and a second image captured before the first image;
   to decompose each of the plurality of optical flows into a vanishing point direction vector in a parallel direction parallel to a line segment connecting a starting point of each of the plurality of optical flows with a vanishing point of the second image, and an orthogonal vector in a direction perpendicular to the parallel direction, the vanishing point of the second image being calculated based on a plurality of optical flows calculated between the second image and a third image captured before the second image;
   to calculate aggregate values of horizontal components and vertical components of the orthogonal vectors, and to calculate a vibration blur amount of the first image based on the aggregate values;
   to correct the plurality of optical flows calculated between the first image and the second image, depending on the vibration blur amount; and
   to calculate a vanishing point of the first image, based on the plurality of corrected optical flows.

2. The image processing device of claim 1, wherein
   the processing circuitry corrects a vibration blur of the first image depending on the vibration blur amount.

3. The image processing device of claim 2, wherein
   the processing circuitry calculates a correction value for correcting the vibration blur of the first image, based on the vibration blur amount; and
   does not correct the vibration blur of the first image when an absolute value of the vibration blur amount is smaller than a predetermined value.

4. The image processing device of claim 2, wherein
   the processing circuitry judges whether the vanishing point of the first image is able to be calculated based on the optical flows calculated by the processing circuitry; and
   does not correct the vibration blur of the first image when the vanishing point of the first image is able to be calculated.

5. The image processing device of claim 1, wherein
   the processing circuitry calculates a horizontal direction vibration blur amount by weighting the aggregated value of horizontal components of the orthogonal vectors with angles of the vanishing point direction vectors, and a vertical direction vibration blur amount by weighting the aggregated value of vertical components of the orthogonal vectors with the angles of the vanishing point direction vectors.

6. The image processing device of claim 5, wherein
   the processing circuitry moves the starting points of the plurality of optical flows calculated between the first image and the second image, according to the horizontal direction vibration blur amount and the vertical direction vibration blur amount.

7. The image processing device of claim 1, wherein
   the processing circuitry calculates the vanishing point of the first image by linear interpolation between a corrected vanishing point on which extended lines of the plurality of corrected optical flows converge and the vanishing point of the second image.

8. An image processing method, comprising:
   calculating a plurality of optical flows between a first image and a second image captured before the first image;
   decomposing each of the plurality of optical flows into a vanishing point direction vector in a parallel direction parallel to a line segment connecting a starting point of each of the plurality of optical flows with a vanishing point of the second image, and an orthogonal vector in a direction perpendicular to the parallel direction, the vanishing point of the second image being calculated based on a plurality of optical flows calculated between the second image and a third image captured before the second image;
   calculating aggregate values of horizontal components and vertical components of the orthogonal vectors, and calculating a vibration blur amount of the first image based on the aggregate values;
   correcting the plurality of optical flows calculated between the first image and the second image, depending on the vibration blur amount; and
   calculating a vanishing point of the first image, based on the plurality of corrected optical flows.

9. A non-transitory computer readable medium storing a program causing a computer to execute an image processing method, the image processing method comprising:
   calculating a plurality of optical flows between a first image and a second image captured before the first image;
   decomposing each of the plurality of optical flows into a vanishing point direction vector in a parallel direction parallel to a line segment connecting a starting point of each of the plurality of optical flows with a vanishing point of the second image, and an orthogonal vector in a direction perpendicular to the parallel direction, the vanishing point of the second image being calculated based on a plurality of optical flows calculated between the second image and a third image captured before the second image;
   calculating aggregate values of horizontal components and vertical components of the orthogonal vectors, and calculating a vibration blur amount of the first image based on the aggregate values;

correcting the plurality of optical flows calculated between the first image and the second image, depending on the vibration blur amount; and
calculating a vanishing point of the first image, based on the plurality of corrected optical flows.

\* \* \* \* \*